United States Patent
Benson et al.

(10) Patent No.: US 10,156,894 B2
(45) Date of Patent: *Dec. 18, 2018

(54) DETECTING AN EVENT WITHIN INTERACTIVE MEDIA

(71) Applicant: Gracenote, Inc., Emeryville, CA (US)

(72) Inventors: Jeff Benson, San Francisco, CA (US); Michael Gubman, San Francisco, CA (US); Craig Kawahara, San Jose, CA (US); Robert Coover, Orinda, CA (US); Markus K. Cremer, Orinda, CA (US); Andy Mai, Oakland, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,170

(22) Filed: Jun. 25, 2018

(65) Prior Publication Data

US 2018/0307300 A1    Oct. 25, 2018

Related U.S. Application Data

(63) Continuation of application No. 15/003,658, filed on Jan. 21, 2016, now Pat. No. 10,055,010, which is a (Continued)

(51) Int. Cl.
| | | |
|---|---|---|
| G06F 17/00 | (2006.01) | |
| G06F 3/01 | (2006.01) | |
| A63F 13/75 | (2014.01) | |
| A63F 13/73 | (2014.01) | |
| A63F 13/69 | (2014.01) | |
| G06F 3/0484 | (2013.01) | |

(52) U.S. Cl.
CPC ............. *G06F 3/01* (2013.01); *A63F 13/69* (2014.09); *A63F 13/73* (2014.09); *A63F 13/75* (2014.09); *G06F 3/0484* (2013.01); *G06F 3/04842* (2013.01)

(58) Field of Classification Search
CPC ......... A63F 13/73; A63F 13/75; G06F 3/0484
See application file for complete search history.

(56) References Cited

U.S. PATENT DOCUMENTS

| | | |
|---|---|---|
| 6,053,814 A | 4/2000 | Pchenitchnikov et al. |
| 7,682,237 B2 | 3/2010 | Ueshima et al. |
| (Continued) | | |

*Primary Examiner* — Mohammed H Zuberi
(74) *Attorney, Agent, or Firm* — McDonnell Boehnen Hulbert & Berhoff LLP

(57) ABSTRACT

As a user is being presented with interactive media by a presenting device, a separate monitoring device may be used to monitor the presentation of the interactive media and detect an event that occurs therein. Such a monitoring device may be configured and positioned to access media content from the presentation of the interactive media. For example, the monitoring device may be configured and positioned to record video content with a camera and record audio content with a microphone. Having accessed this media content, the monitoring device may generate an identifier, such as a fingerprint or watermark, of the media content and compare the generated identifier with a reference identifier that is generated from the source of the media content. Based on the generated identifier matching the reference identifier, the monitoring device may detect that an event has occurred within the interactive media presentation and present a corresponding notification.

20 Claims, 10 Drawing Sheets

Related U.S. Application Data continuation of application No. 13/795,877, filed on Mar. 12, 2013, now Pat. No. 9,372,531.

(56) References Cited

U.S. PATENT DOCUMENTS

| | | |
|---|---|---|
| 7,976,385 B2 | 7/2011 | Riggs et al. |
| 8,616,973 B2 | 12/2013 | Osman |
| 8,979,658 B1 | 3/2015 | Kulavik |
| 9,319,820 B2 | 4/2016 | Boustead et al. |
| 2002/0161462 A1 | 10/2002 | Fay et al. |
| 2002/0161586 A1 | 10/2002 | Wang |
| 2002/0161882 A1 | 10/2002 | Chatani |
| 2006/0233389 A1 | 10/2006 | Mao et al. |
| 2007/0155494 A1 | 7/2007 | Wells et al. |
| 2008/0004115 A1 | 1/2008 | Chatani |
| 2008/0009332 A1 | 1/2008 | Kake |
| 2009/0176569 A1 | 7/2009 | Eves et al. |
| 2010/0027837 A1 | 2/2010 | Levy et al. |
| 2012/0014553 A1 | 1/2012 | Bonanno |
| 2012/0086631 A1 | 4/2012 | Osman et al. |
| 2012/0108320 A1 | 5/2012 | Ye et al. |
| 2013/0041648 A1 | 2/2013 | Osman |
| 2013/0063550 A1 | 3/2013 | Ritchey et al. |
| 2014/0004934 A1 | 1/2014 | Peterson et al. |
| 2014/0274353 A1 | 9/2014 | Benson et al. |
| 2015/0223005 A1 | 8/2015 | Hardman et al. |
| 2016/0094877 A1 | 3/2016 | Heffernan et al. |
| 2017/0209786 A1 | 7/2017 | Zhu et al. |

DETECTING AN EVENT WITHIN INTERACTIVE MEDIA

RELATED APPLICATIONS

This is a continuation of U.S. patent application Ser. No. 15/003,658, filed Jan. 21, 2016, which is a continuation of U.S. patent application Ser. No. 13/795,877, filed Mar. 12, 2013, each of which is incorporated herein by reference in its entirety.

TECHNICAL FIELD

The subject matter disclosed herein generally relates to the processing of data. Specifically, the present disclosure addresses systems and methods to facilitate detecting an event within interactive media.

BACKGROUND

Media (e.g., digital media) may be presented to one or more users, for example, for purposes of entertainment, merchandising (e.g., advertising), education, public service, or other communication of information. Some media may be characterized as being "interactive" where the user to whom the media is presented can interact with the media itself (e.g., its content). That is, the content of the media depends, at least partly, on input from the user. A computer game (e.g., videogame) is an example of interactive media in which a user (e.g., game player) has at least some control over the content of the computer game (e.g., video or audio associated with achieving or failing a goal, gaining or losing an item in the game, or the appearance of the user's character or avatar within the game). Software that emulates or simulates a musical instrument (e.g., a drum machine or piano tutorial) is another example of interactive media, since the user fully or partly controls the audio content (e.g., sounds or music) produced by the software.

Generally, simply allowing a user to control a playing of media that cannot be changed by the user would not be considered "interactive." For example, a movie may be presented to a user (e.g., movie viewer) via a player device (e.g., a portable media player) or player software (e.g., executing on a computer). Although the player device or software may allow the user to play the movie, pause the movie, skip forward within the movie, and skip backward within the movie, the movie itself (e.g., the content of the movie) is unchangeable by the viewer. Hence, playing the movie itself is not an interactive experience for the viewer.

In some situations, an interactive experience includes the playing or triggering of non-interactive media. For example, a video "cut scene" may be automatically played between levels of a computer game. In such an example, the computer game is an interactive experience, for at least the reason that the player controls when one level is completed, thereby controlling when the video "cut scene" is played, even though the video "cut scene" itself is non-interactive.

BRIEF DESCRIPTION OF THE DRAWINGS

Some embodiments are illustrated by way of example and not limitation in the figures of the accompanying drawings.

DETAILED DESCRIPTION

Figure 1:
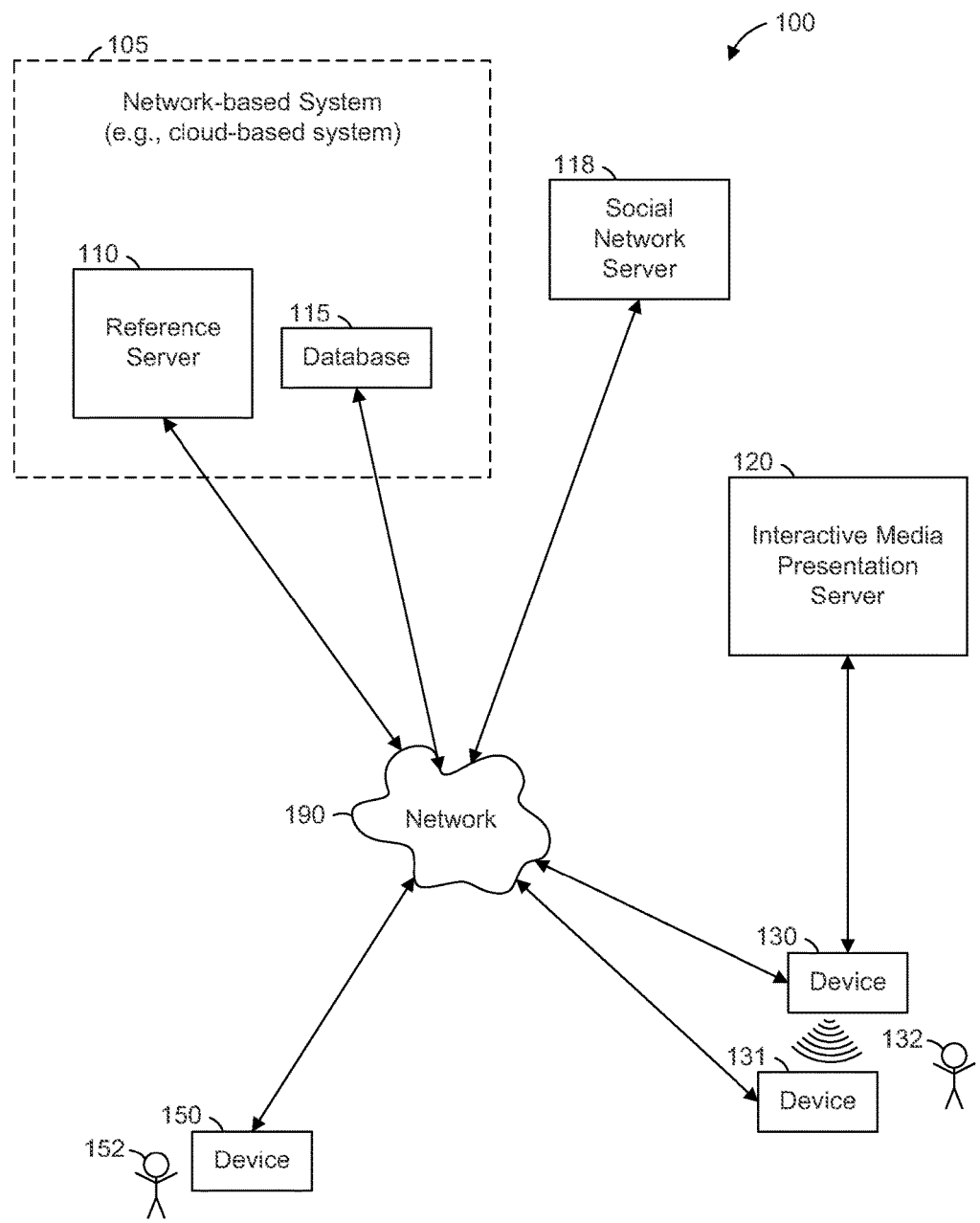
FIG. 1 is a network diagram illustrating a network environment suitable for detecting an event within interactive media, according to some example embodiments.

Example methods and systems are directed to detection of one or more events within interactive media (e.g., within a presentation of interactive media). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A device (e.g., a computer, game console, or mobile device) may be used to present interactive media (e.g., a game, such as a videogame) to a user of the device (e.g., a player of the game). The interactive media may be stored on the device (e.g., in local memory or other storage) and presented by the device (e.g., by executing a software application, applet, or app). In other situations, the interactive media may be stored by a server (e.g., a game server) and provided to the device by the server (e.g., streamed live, downloaded portion by portion, or downloaded in full) for presentation by the device. The interactive media may include media files that each store media content (e.g., video content, image content, or audio content), and a presentation of the interactive media may be generated, presented, or both, by the device based on user input that influences or controls which media files are included in the presentation. That is, the user input may fully or partially determine whether and when a particular media file is included in the presentation.

As the user is being presented with the interactive media by a presenting device (e.g., first device), a monitoring device (e.g., second device) may be used to monitor the presentation of the interactive media and detect an event that occurs therein. Such a monitoring device may be configured and positioned to access media content from the presentation of the interactive media. For example, the monitoring device may be configured and positioned to record video content (e.g., one or more video frames, which may be still images) with a camera and record audio content with a microphone.

Having accessed this media content, the monitoring device may generate an identifier, such as a fingerprint or watermark, of the media content and compare the generated identifier with a reference identifier that is generated from the source of the media content. Based on the generated identifier matching the reference identifier, the monitoring device may detect that an event has occurred within the interactive media presentation and present a corresponding notification.

Accordingly, the monitoring device may present a notification that references the occurrence of the detected event. Such a notification may be presented to the user (e.g., via the monitoring device, the presenting device, or both). The notification may be presented to another user (e.g., a socially connected friend, follower, or connection of the user, as identified by or according to a social networking system). In some example embodiments, the notification is presented by the monitoring device. However, in alternative example embodiments, the monitoring device may cause the presenting device (e.g., the device that presents the interactive media) to present the notification. In some example embodiments, the presenting device and the monitoring device are combined into a single device.

Moreover, the monitoring device may function entirely independent of any server or other source that may be providing the interactive media presentation to the presentation device. That is, the monitoring device may detect an event within the interactive media presentation and present a corresponding notification without communication from such a server or other source of the interactive media presentation. Further details are described below.

FIG. 1 is a network diagram illustrating a network environment 100 suitable for detecting an event within interactive media, according to some example embodiments. The network environment 100 includes a reference server 110, a database 115, a social network server 118, an interactive media presentation server 120, and devices 130, 131, and 150, all of which may be communicatively coupled to each other via a network 190. In some example embodiments, the interactive media presentation server 120 is communicatively coupled to the device 130 by a separate network or other communication path. The reference server 110, the database 115, the social network server 118, the interactive media presentation server 120, and the devices 130, 131, and 150 may each be implemented in a computer system, in whole or in part, as described below with respect to FIG. 10. As shown in FIG. 1, the reference server 110, with or without the database 115, may form all or part of a network-based system 105. For example, the network-based system 105 may be or include a cloud-based system that provides one or more network-based services (e.g., provision of reference identifiers for media content included as part of various interactive media).

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132.

The user 132 may also be associated with the device 131 and may be a user of the device 131. For example, the device 130 may be a desktop computer, a vehicle computer, a tablet computer, a navigational device, a portable media device, or a smart phone belonging to the user 132. As shown in FIG. 1, the device 131 is able to monitor (e.g., by accessing or receiving) media content presented as part of an interactive media presentation by the device 130. In certain example embodiments, the device 131 and the device 130 are combined into a single device. In such example embodiments, the monitoring of the media content may be performed internally by the single device (e.g., within memory).

Likewise, the user 152 is not part of the network environment 100, but is associated with the device 150. According to various example embodiments, the user 152 is a socially connected friend, follower, or connection of the user 132 (e.g., as identified or indicated by a social networking service, such as Facebook® or Twitter®). As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the reference server 110 and the device 131). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
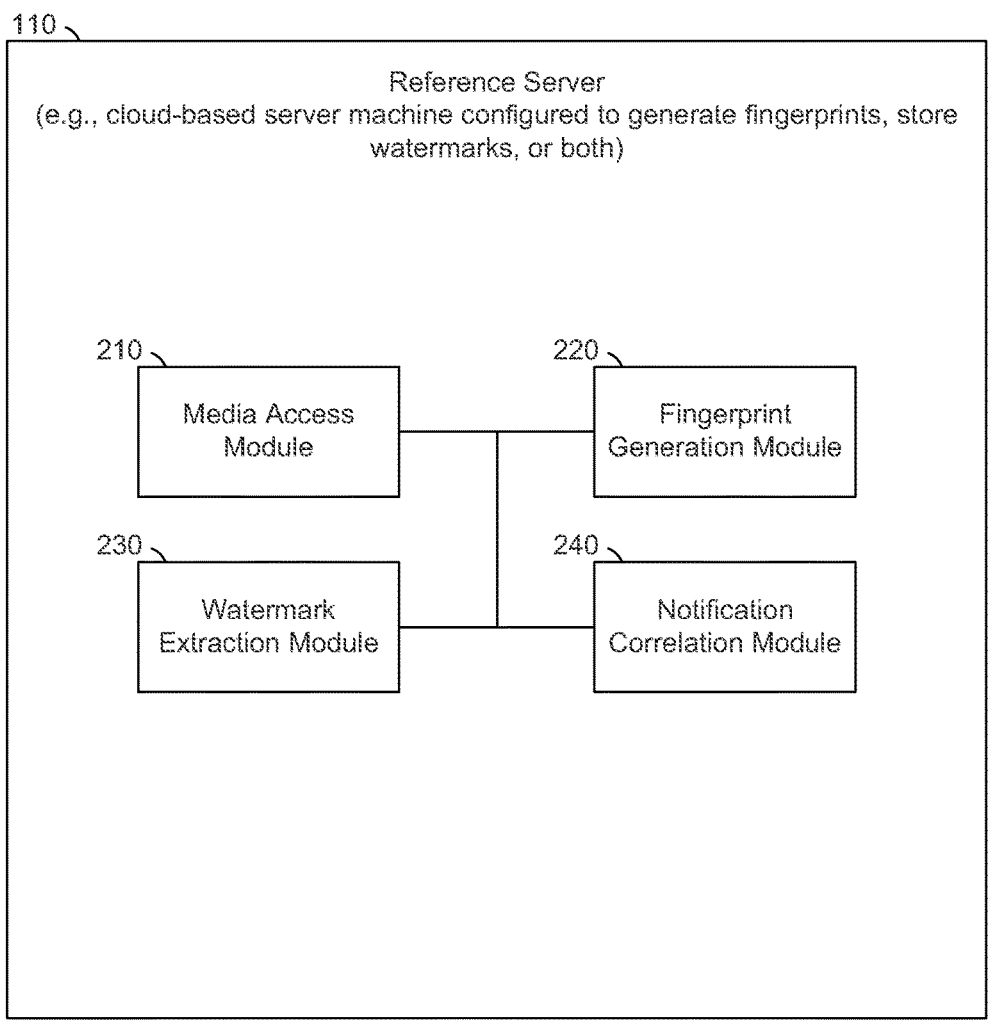
FIG. 2 is a block diagram illustrating components of a reference server configured to facilitate detection of an event within interactive media, according to some example embodiments.

FIG. 2 is a block diagram illustrating components of the reference server 110, which may be configured to facilitate detection of an event within interactive media, according to some example embodiments. The reference server 110 may be a machine that, as shown, includes a media access module 210, a fingerprint generation module 220, a watermark extraction module 230, and a notification correlation module 240, all configured to communicate with each other (e.g., via a bus, shared memory, or a switch).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The media access module 210 of the reference server 110 is configured to access media (e.g., from the database 115, from the interactive media presentation server 120, or from both). The accessed media may include one or more media files containing media content that may be presentable as part of the interactive media presentation. For example, the interactive media presentation server 120 may store such media files, and the media access module 210 of the reference server 110 may access or retrieve those media files. The database 115 may be used by the media access module 210 to temporarily or permanently store the media files (e.g., for fingerprint generation, watermark extraction, or both).

The fingerprint generation module 220 of the reference server 110 is configured to generate reference fingerprints from the media files that are accessed by the media access module 210. For example, the fingerprint generation module 220 may apply one or more algorithms to a video file and generate a reference fingerprint that is usable to identify a presentation (e.g., playback) of that video file within an interactive media presentation. As another example, the fingerprint generation module 220 may apply one or more algorithms to an audio file and thus generate a reference fingerprint usable to identify a playing of that audio file within the interactive media presentation. As a further example, the fingerprint generation module 220 may apply one or more algorithms to an image file and accordingly generate a reference fingerprint usable to identify a displaying of that image file within the interactive media presentation. As a yet further example, the fingerprint generation module 220 may apply one or more algorithms to a text file and thereby generate a reference fingerprint that is usable to identify, within the interactive media presentation, an appearance of the text contained in the text file.

The watermark extraction module 230 of the reference server 110 is configured to extract reference watermarks from the media files that are accessed by the media access module 210. For example, the watermark extraction module 230 may apply one or more algorithms to a video file and extract a reference watermark that is usable to identify a presentation (e.g., playback) of that video file within an interactive media presentation. As another example, the watermark extraction module 230 may apply one or more algorithms to an audio file and thus extract a reference watermark usable to identify a playing of that audio file within the interactive media presentation. As a further example, the watermark extraction module 230 may apply one or more algorithms to an image file and accordingly extract a reference watermark usable to identify a displaying of that image file within the interactive media presentation. As a yet further example, watermark extraction module 230 may apply one or more algorithms to a text file and thereby extract the reference watermark that is usable to identify, within the interactive media presentation, an appearance of the text contained in the text file.

According to various example embodiments, one or both of the fingerprint generation module 220 and the watermark extraction module 230 may be included in the reference server 110. Hence, the reference server 110 may form all or part of a cloud-based server system (e.g., of one or more machines) that is configured to generate fingerprints from various media content, store watermarks for various media content, or any suitable combination thereof.

The notification correlation module 240 of the reference server 110 is configured to correlate a media file (e.g., accessed by the media access module 210 and processed by the fingerprint generation module 220, the watermark extraction module 230, or both) with a notification that references an event which may occur within the interactive media presentation. For example, supposing the interactive media presentation is a videogame, the media file may contain video content that shows an in-game character congratulating the user (e.g., game player) on completing a difficult level of the game. In such a case, the completion of the difficult level of the game is the event that may occur within the interactive presentation, and this event, this media file, or both may be correlated with a notification that references the completion of this level of the game. The notification correlation module 240 may access event data that correlates the event with the media file (e.g., from the interactive media presentation server, from the database 115, or from both). Based on such event data, the notification correlation module 240 may map the event, the media file, or both, to the corresponding notification, which may be stored in the database 115 (e.g., after being automatically or manually generated based on the media file). This correspondence relationship (e.g., map) may be stored in the database 115.

Thus, the reference server 110, the database 115, or both, may be configured to provide (e.g., to any one or more of devices 130, 131, and 150) a reference identifier (e.g., fingerprint or watermark) of the media file and a notification that corresponds to an event signified by the media file being presented within the interactive media presentation. The reference identifier and the notification may be provided as part of a network-based service that supplements the interactive media presentation with additional information (e.g., the notification) upon detection of the event occurring. In some example embodiments, the network-based system 105 provides such a service.

Moreover, such a service may be provided without any cooperation, assistance, or other communication from the interactive media presentation server 120 or other source of the interactive media presentation. Indeed, some or all of the network-based system 105 may obtain and provide reference identifiers of various media files and the media content thereof, by accessing such media content (e.g., as a user) during a presentation of the interactive media presentation. For example, reference identifiers may be obtained from playing a computer game (e.g., to completion, automatically, by executing software scripts to simulate user input), and corresponding notifications may be generated (e.g., automatically or manually) and mapped to the obtained reference identifiers. As a result, the network-based system 105 may provide a supplemental information service that complements the interactive media presentation, but is separate from the interactive media presentation and produced independently (e.g., without collaboration with the author or source of the interactive media presentation).

Figure 3:
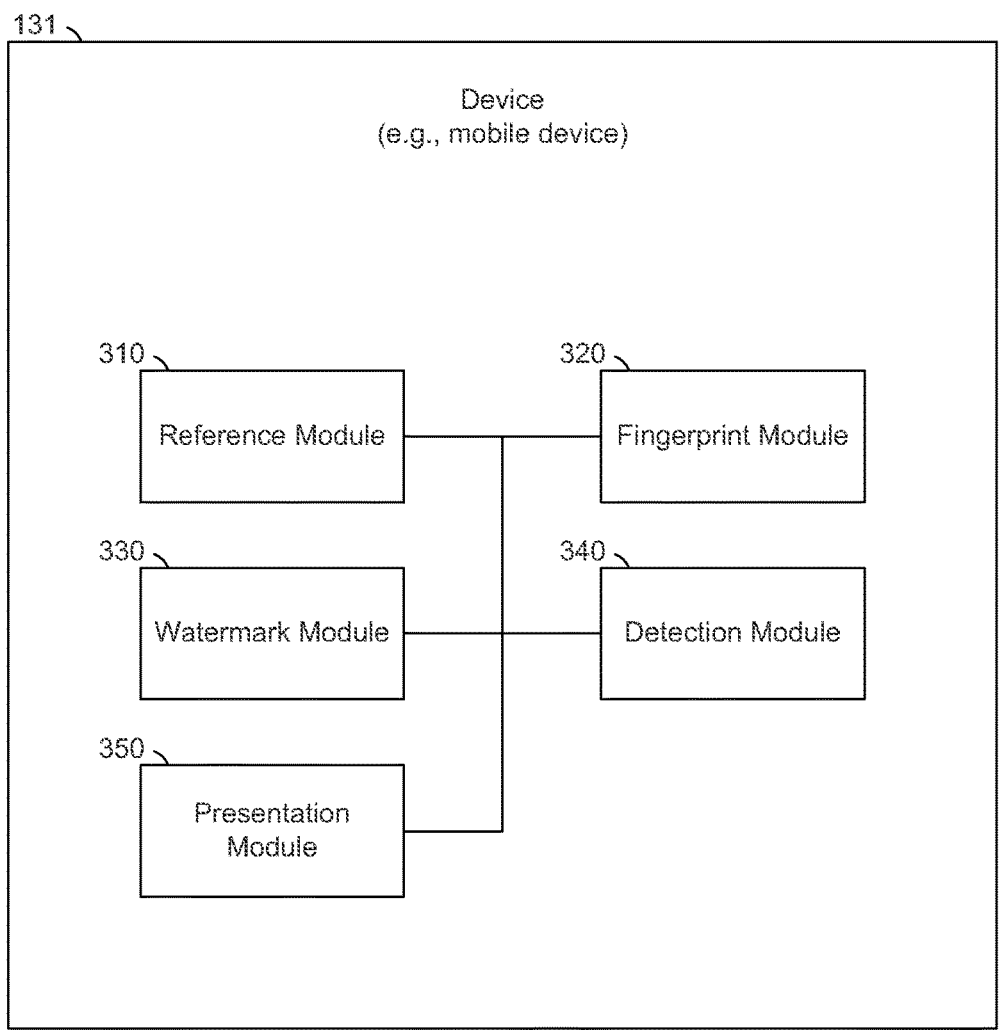
FIG. 3 is a block diagram illustrating components of a device configured to detect an event within interactive media, according to some example embodiments.

FIG. 3 is a block diagram illustrating components of the device 131, which may be configured to detect an event within interactive media, according to some example embodiments. The device 131 may be a machine that, as shown, includes a reference module 310, a fingerprint module 320, a watermark module 330, a detection module 340, and a presentation module 350, all configured to communicate with each other (e.g., via a bus, shared memory, or a switch).

As noted above, any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As noted above, the device 131 may monitor an interactive media presentation being presented by the device 130 (e.g., by recording or otherwise accessing presented media content included in the interactive media presentation). Media content being presented as part of the interactive media presentation may thus be accessed by the device 131 (e.g., for detection of the event that corresponds to the media content). For example, the device 131 may include a camera that is configured to capture video content, image content, text content, or any suitable combination thereof, that appears in the interactive media presentation. As another example, the device 131 may include a microphone is configured to capture audio content that is played within the interactive media presentation.

The reference module 310 of the device 131 is configured to access a reference identifier (e.g., reference fingerprint or reference watermark) that is generated or extracted (e.g., by the reference server 110) from media content which is presentable as part of the interactive media presentation. The reference identifier may be accessed from the network-based system 105 (e.g., from the reference server 110 or from the database 115). The reference identifier may be denoted herein as a "first identifier." As noted above, within the interactive media presentation, an event that corresponds to the media content may be configured to occur in response to a user input (e.g., generated by the user 132 and submitted via the device 130, as the user 132 is interacting with the interactive media presentation).

The fingerprint module 320 of the device 131 is configured to generate a fingerprint from a playback of the media content as part of the interactive media presentation. For example, the fingerprint module 320 may apply one or more algorithms to a video file and generate a fingerprint that may be compared to a reference fingerprint for that video file and thereby identify a presentation (e.g., playback) of that video file within an interactive media presentation. As another example, the fingerprint module 320 may apply one or more algorithms to an audio file and thus generate a fingerprint that may be compared to a reference fingerprint for that audio file and thereby identify a playing of that audio file within the interactive media presentation. As a further example, the fingerprint module 320 may apply one or more algorithms to an image file and accordingly generate a fingerprint that may be compared to a reference fingerprint for that image file and thereby identify a displaying of that image file within the interactive media presentation. As a yet further example, the fingerprint module 320 may apply one or more algorithms to a text file and thereby generate a fingerprint that may be compared to a reference fingerprint for that text file and thereby identify, within the interactive media presentation, an appearance of the text contained in the text file.

The watermark module 330 of the device 131 is configured to extract a watermark from the playback of the media content as part of the interactive media presentation. For example, the watermark module 330 may apply one or more algorithms to a video file and extract a watermark that may be compared to a reference watermark for that video file and thereby identify a presentation (e.g., playback) of that video file within an interactive media presentation. As another example, the watermark module 330 may apply one or more algorithms to an audio file and thus extract a watermark that may be compared to a reference watermark for that audio file and thereby identify a playing of that audio file within the interactive media presentation. As a further example, the watermark module 330 may apply one or more algorithms to an image file and accordingly extract a watermark that may be compared to a reference watermark for that image file and thereby identify a displaying of that image file within the interactive media presentation. As a yet further example, the watermark module 330 may apply one or more algorithms to a text file and thereby extract a watermark that may be compared to a reference watermark for that text file and thereby identify, within the interactive media presentation, an appearance of the text contained in the text file.

According to various example embodiments, one or both of the fingerprint module 320 and the watermark module 330 may be included in the device 131. Hence, the device 131 may be configured to generate fingerprints from various media content monitored by the device 131, extract watermarks for such media content, or any suitable combination thereof.

The detection module 340 of the device 131 is configured to detect an occurrence of the event that corresponds to the media content. As noted above, the event may be configured to occur in response to a user input (e.g., from the user 132). The detection of this occurrence of the event may be based on the identifier generated by the device 131 matching the reference identifier accessed by the device 131. For example, the occurrence of the event may be detected based on a match between a fingerprint generated by the fingerprint module 320 and a reference fingerprint accessed by the reference module 310. As another example, the occurrence of the event may be detected based on a match between a watermark extracted by the watermark module 330 and a reference watermark accessed by the reference module 310.

The presentation module 350 of the device 131 is configured to present a notification (e.g., accessed from the network-based system 105) that references the occurrence of the event. The notification may be presented based on the detecting of the event's occurrence, based on the identifier generated by the device 131 matching the reference identifier accessed by the device 131, or based on both.

Figure 4:
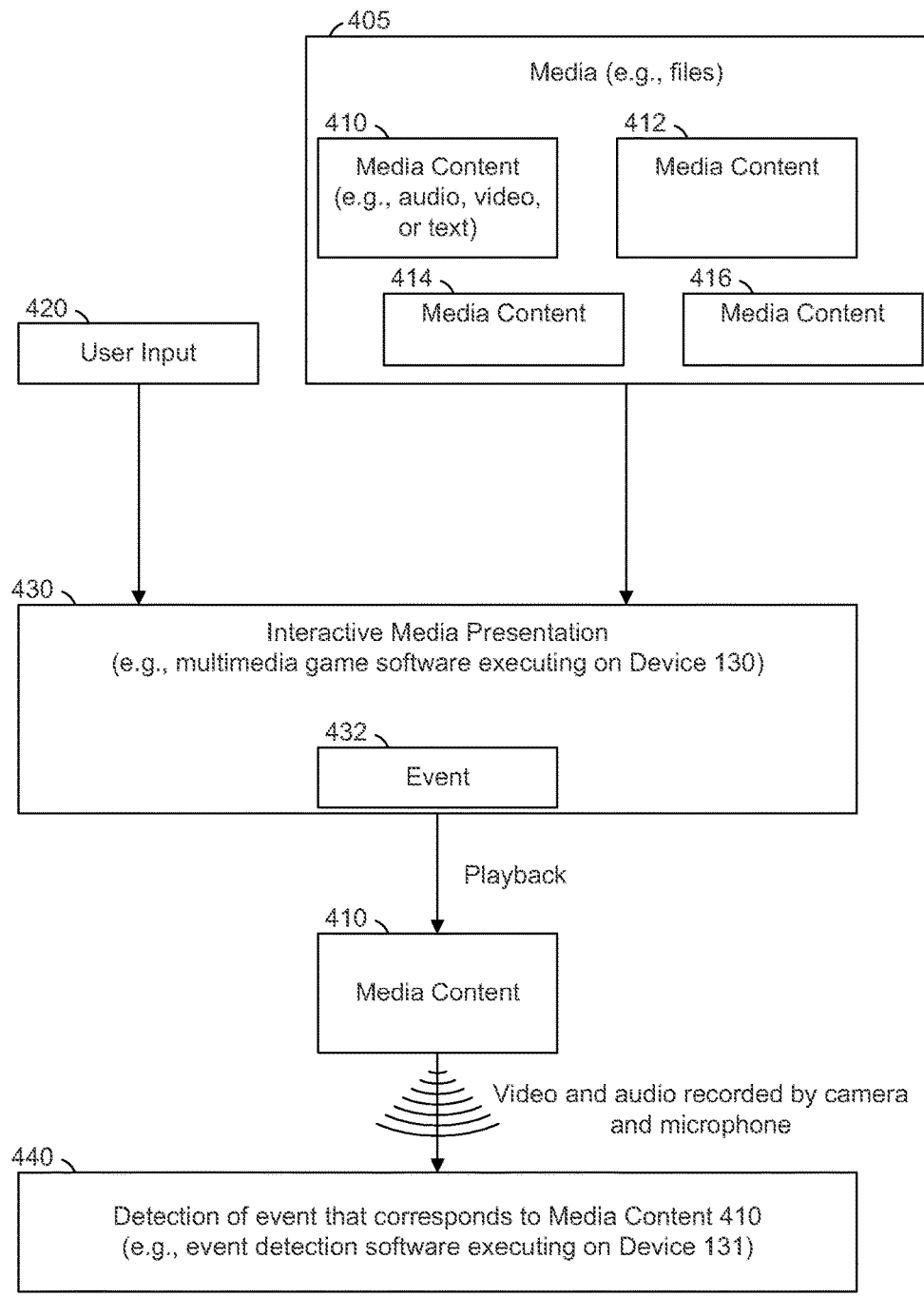
FIG. 4 is a conceptual diagram illustrating detection of an event within an interactive media presentation, according to some example embodiments.

FIG. 4 is a conceptual diagram illustrating detection of an event 432 within an interactive media presentation 430, according to some example embodiments. As shown, the interactive media presentation 430 is generated, presented, or both (e.g., by the device 130) based on user input 420 and based on media 405. The user input 420 may be received from the device 130 that is presenting the interactive media presentation 430. For example, the interactive media presentation 430 may be a game (e.g., multimedia game) presented by game software that is executing on the device 130, and the user input 420 may be or include control signals, commands, or choices generated by the user 132 as part of playing the game.

As shown in FIG. 4, the media 405 may take the form of media files that contain media content 410, 412, 414, and 416. Examples of media content (e.g., media content 410) include video, an image, audio, text, or any suitable combination thereof. The arrows pointing to the interactive media presentation 430 from the user input 420 and from the media 405 indicate that the interactive media presentation 430 is influenced, at least in part, by the user input 420 and the media 405.

In the example illustrated in FIG. 4, the event 432 occurs within the interactive media presentation 430 (e.g., as a result of the user input 420). Because the event 432 is occurring, the interactive media presentation 430 includes (e.g., incorporates) the media content 410, which signifies the occurrence of the event 432. As a result, a playback of the media content 410 is initiated by the interactive media presentation 430 (e.g., via the device 130).

Since the device 131 is monitoring the interactive media presentation 430 and the playback of various media content included therein, a detection 440 of the event 432 that corresponds to the media content 410 may be performed (e.g., by the device 131). For example, the device 131 may be configured by event detection software that executes on the device 131 and performs the detection 440. According to various example embodiments, a method discussed below with respect to FIG. 7-9 may be implemented by such event detection software.

Figure 5:
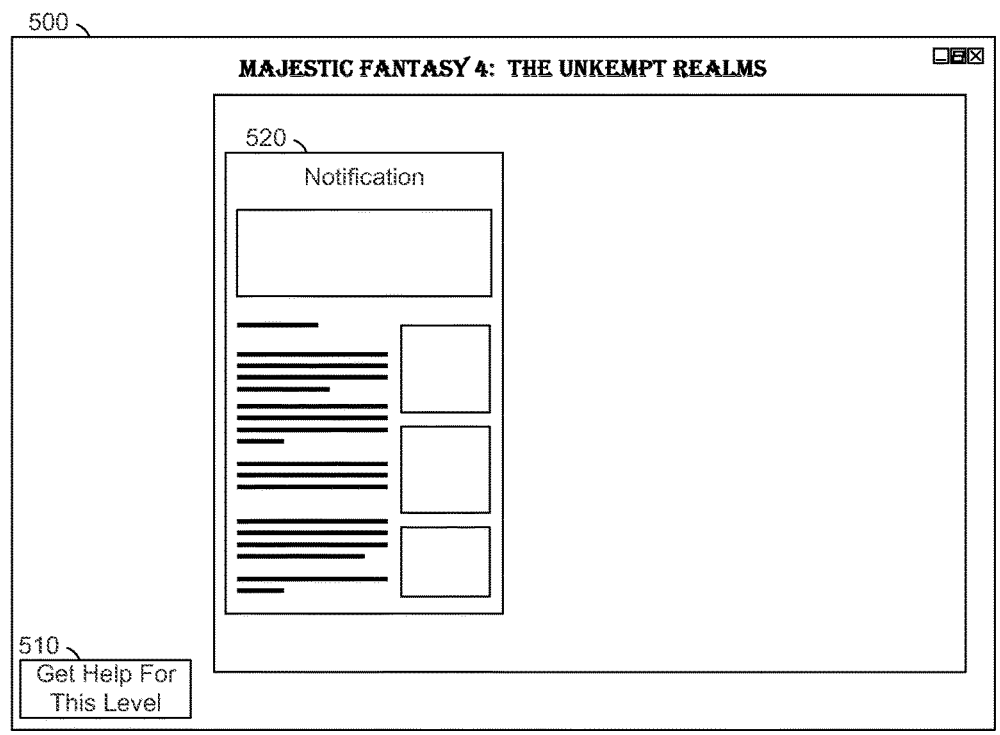
FIG. 5 is a layout diagram illustrating a notification that may be displayed with an interactive media presentation, according to some example embodiments.

FIG. 5 is a layout diagram illustrating a notification 520 that may be displayed with (e.g., within) an interactive media presentation, according to some example embodiments. In FIG. 5, a user interface 500 is depicted in the example form of a graphical window. Such a graphical window may be displayed on a display screen of the device 130, while the device 130 is presenting the interactive media presentation 430 (e.g., within the user interface 500). In some example embodiments, the interactive media presentation 430 is a game (e.g., titled "Majestic Fantasy 4: The Unkempt Realms"), and the user interface 500 is used to present various media content of the game (e.g., media content 410).

In response to the detection 440 of the event 432 that corresponds to the media content 410, the notification 520 may be presented. FIG. 5 depicts the notification 520 being presented within the user interface 500. In alternative example embodiments, the notification 520 may be presented outside the user interface 500 (e.g., elsewhere on a display screen of the device 130, on a display screen of the device 131, or on a display screen of the device 150). The notification 520 references the event 432 (e.g., the occurrence of the event 432 within the interactive media presentation 430).

As shown in FIG. 5, some example embodiments of the user interface 500 include a help button 510 (e.g., labeled "Get Help for This Level"). In some example embodiments, the help button 510 appears in the user interface 500 in response to the detection 440 of the event 432. For example, the event 432 may be an in-game defeat of the user 132 (e.g., player), and the detection 440 of such a defeat may cause the help button 510 to appear within the user interface 500. If the user 132 clicks on the help button 510, the notification 520 appears within the user interface 500 (e.g., to provide information that may be helpful to avoid another such defeat). As another example, the event 432 may be an in-game promotion of the user 132 to a more difficult level of the game, and the detection 440 of such a promotion may trigger the appearance of the help button 510. In response to the user 132 clicking on the help button 510, the notification 520 may be shown (e.g., to provide strategy for playing the more difficult level of the game).

Figure 6:
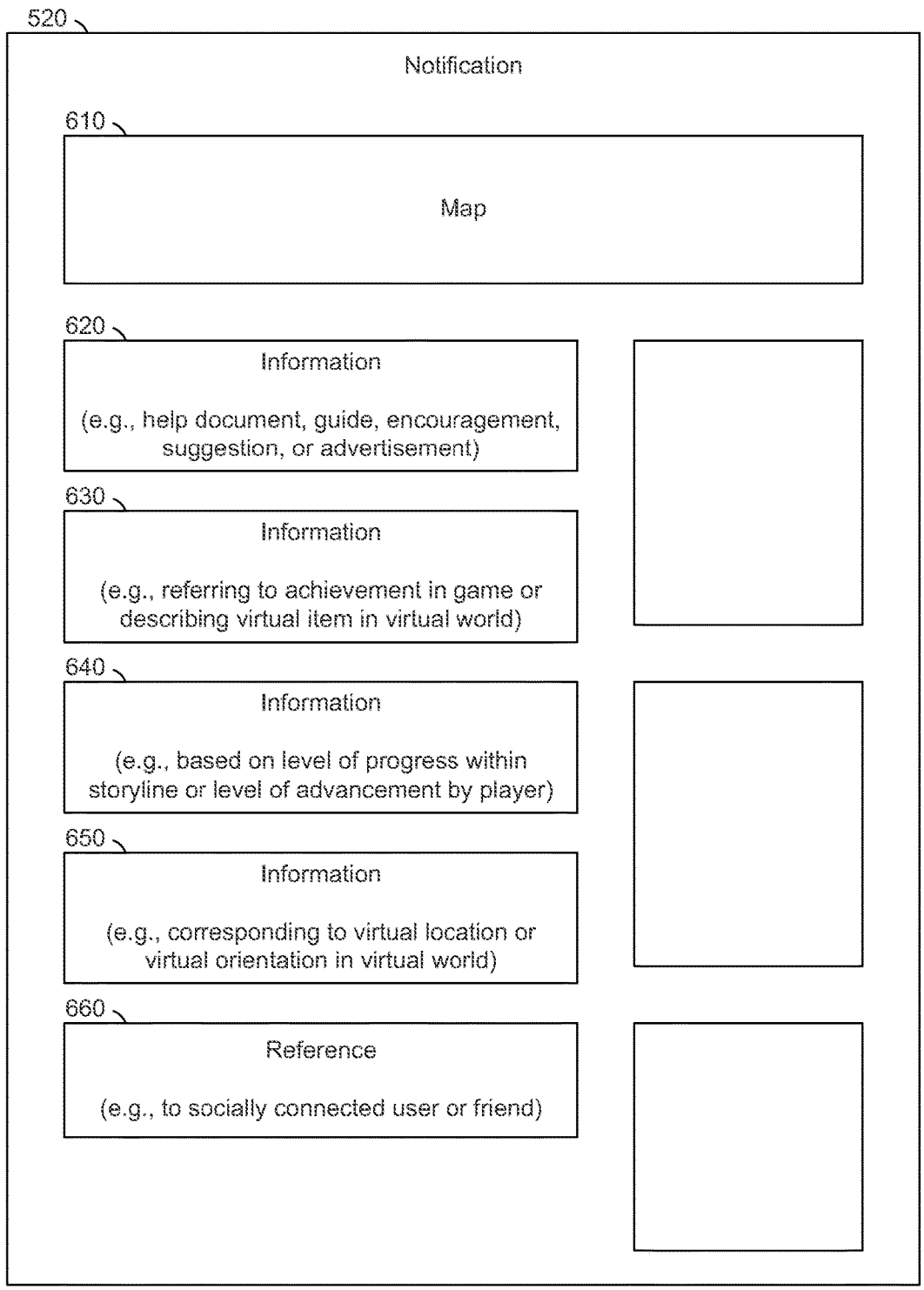
FIG. 6 is a layout diagram illustrating the notification, according to some example embodiments.

FIG. 6 is a layout diagram illustrating the notification 520, according to some example embodiments. As noted above, the notification references the event 432 within the interactive media presentation 430 (e.g., references the occurrence of the event 432), and according to various example embodiments, the notification 520 may be presented to one or more of the users 132 and 152 (e.g., via one or more of the devices 130, 131, and 150).

In general, the notification 520 may include any information that is pertinent to the occurrence of the event 432 within the interactive media presentation 430. As shown in FIG. 6, the notification 520 may include a map 610 (e.g., an in-game map of a player's current level within a game). The notification 520 may include one or more pieces of information 620, 630, 640, and 650, which each may reference the occurrence of the event 432. Examples of such information include a help document, a guide, an encouragement (e.g., to a player of a game, that the player persevere in attempting to win a difficult section or level of the game), a suggestion (e.g., that the player of the game attempt a different strategy), or an advertisement (e.g., that the player purchase a virtual in-game item that may enhance the player's enjoyment of the current section or level of the game). Additional examples of such information include an offer for the purchase of one or more virtual goods (e.g., as an in-game purchase, an in-app purchase, downloadable level content (DLC), or any suitable combination thereof), as well as some or all of a user interface (e.g., an electronic storefront) operable to initiate such a purchase. Further examples of such information include an offer for the purchase of one or more physical goods (e.g., related or recommended merchandise, games, memorabilia, soundtracks, or other physical items), as well as some or all of a user interface operable to initiate such a purchase. In some example embodiments, the notification 520 includes a hyperlink to such information.

As noted in FIG. 6, some or all of the information 620, 630, 640, or 650 may refer to an achievement that is signified by the event 432 occurring within the interactive media presentation 430 (e.g., completion of a level in a game, as signified by a video "cut scene" that appears at the end of the level). Any of the information 620, 630, 640, or 650 may describe a virtual item in a virtual world (e.g., an upgraded sword within a fantasy adventure game, as signified by special music that plays upon acquisition of the upgraded sword).

Some or all of the information 620, 630, 640, or 650 may be included in the notification 520 based on a level of progress within a storyline of the interactive media presentation (e.g., a plot of a game). Similarly, any of the information 620, 630, 640, or 650 may be included based on a level of advancement attained by the user 132 (e.g., within a character arc of an in-game character or avatar of the user 132). Accordingly, any of the information 620, 630, 640, or 650 may refer to such a level of progress or level of advancement.

In some example embodiments, some or all of the information 620, 630, 640, or 650 corresponds to a virtual location, virtual orientation, or both, within a virtual world. For example, suppose the interactive media presentation 430 is an immersive game within a three-dimensional virtual world. The event 432 may be an arrival of the player at a particular location within the virtual world (e.g., a waterfall that hides a treasure chest), and the event 432 may be detected by the corresponding playback of the media content 410 (e.g., a particular audio pattern of water splashing sounds, a particular visual pattern of rock formations, or both). Based on this, any of the information 620, 630, 640, or 650 may reference that particular location (e.g., the waterfall) and provide strategy, hints, or advertisements pertinent thereto (e.g., "Look behind the waterfall to find treasure!" or "If you want to search behind the waterfall, would you like to buy some goggles or an umbrella?").

In certain situations, the media content 410 may be spatialized (e.g., by inclusion of multi-channel audio content) with respect to the three-dimensional virtual world. Accordingly, the event 432 may be detected by a corresponding playback of the media content 410 with a particular virtual orientation (e.g., a particular audio pattern of water splashing sounds whose frequency distribution indicates that the player is facing towards the waterfall that hides the treasure chest, a particular visual pattern of rock formations indicating that the player is facing the waterfall, or both). Based on this, any of the information 620, 630, 640, or 650 may reference that particular orientation (e.g., facing towards the waterfall) and provide strategy, hints, or advertisements pertinent thereto (e.g., "Don't get distracted by the waterfall! Enemies may be lurking behind you!" or "If you want to search behind the waterfall, would you like to hire a helper to watch your back?").

In example embodiments where the notification 520 is presented to the user 152 via the device 150, the notification 520 may include a reference 660 to the user 132. As noted above, the users 132 and 152 may be socially connected to each other (e.g., as friends, followers, or connections, such as may be indicated by a social networking service). Accordingly, the notification 520 with the reference 660 may notify the user 152 that the user 132 has experienced the event 432 within the interactive media presentation 430. For example, the notification 520 may thus tell the user 152 that the user 132 has been defeated in playing a game, has been promoted to a more difficult level of the game, has acquired a virtual object within the game, has advanced to a particular point in the game's storyline, or has arrived at a particular virtual location within a virtual world in which the game is played.

Figure 7:
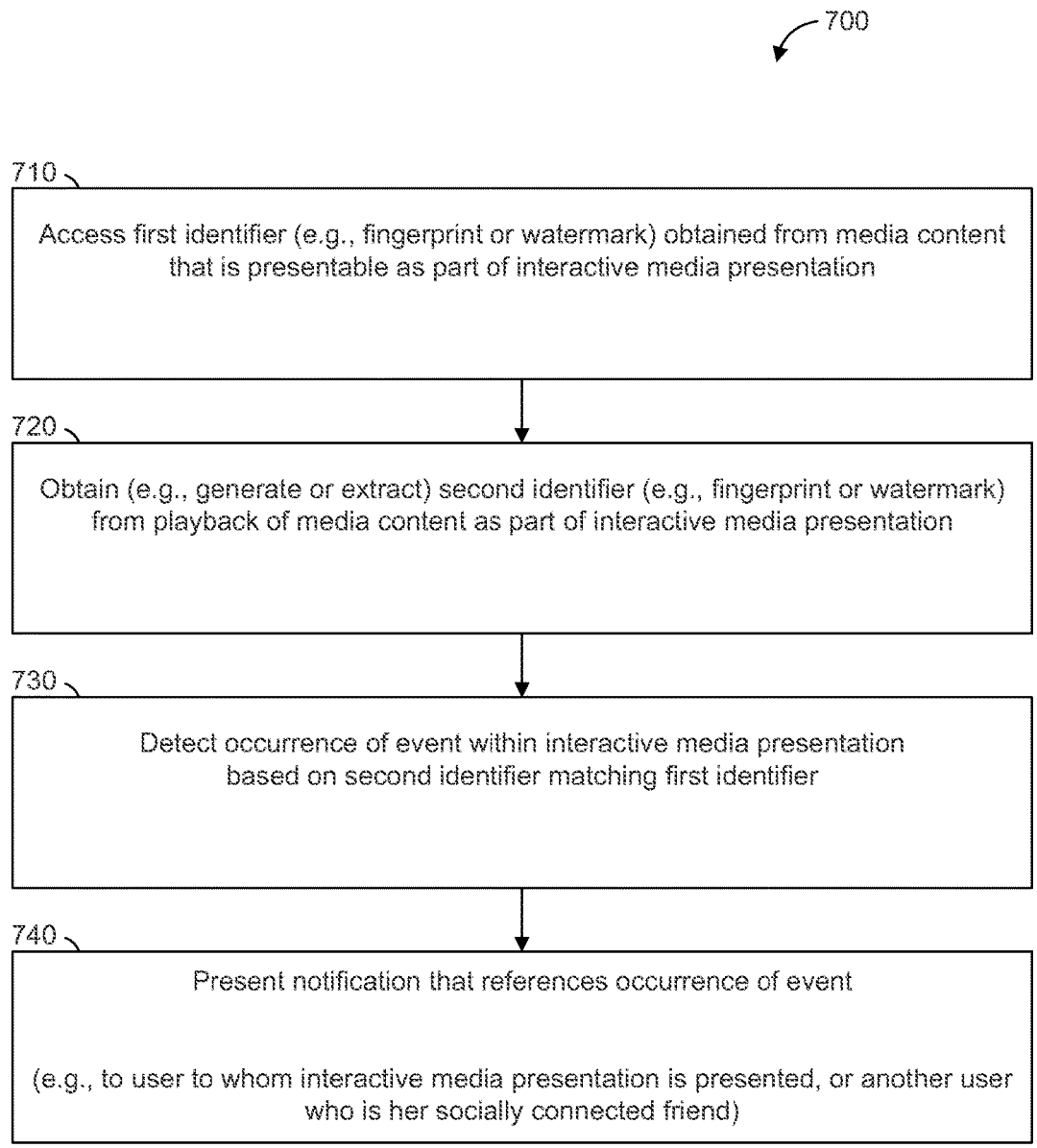
FIG. 7-9 are flowcharts illustrating operations of a device in performing a method of detecting an event within interactive media, according to some example embodiments.
Figure 8:
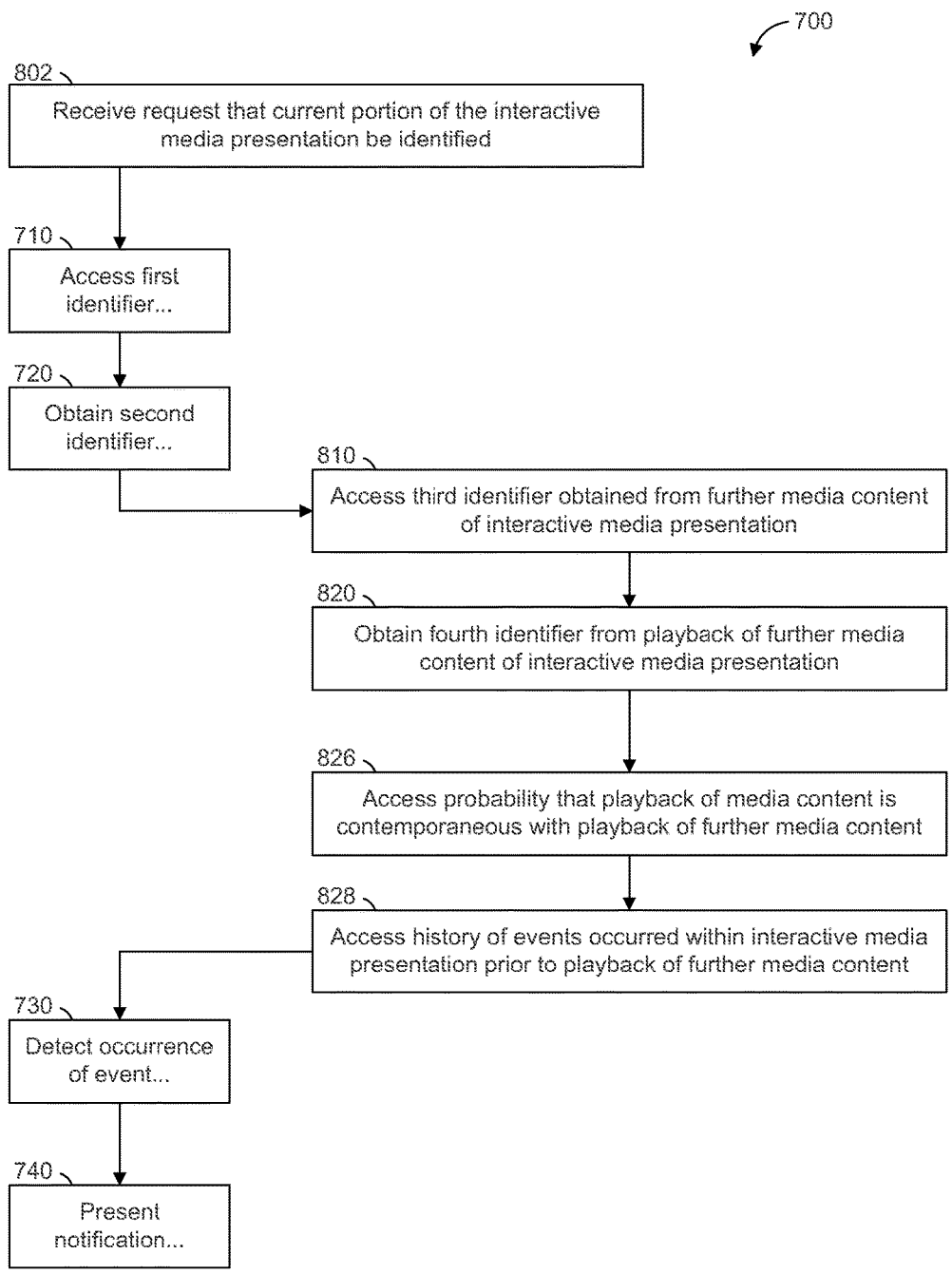
Figure 9:
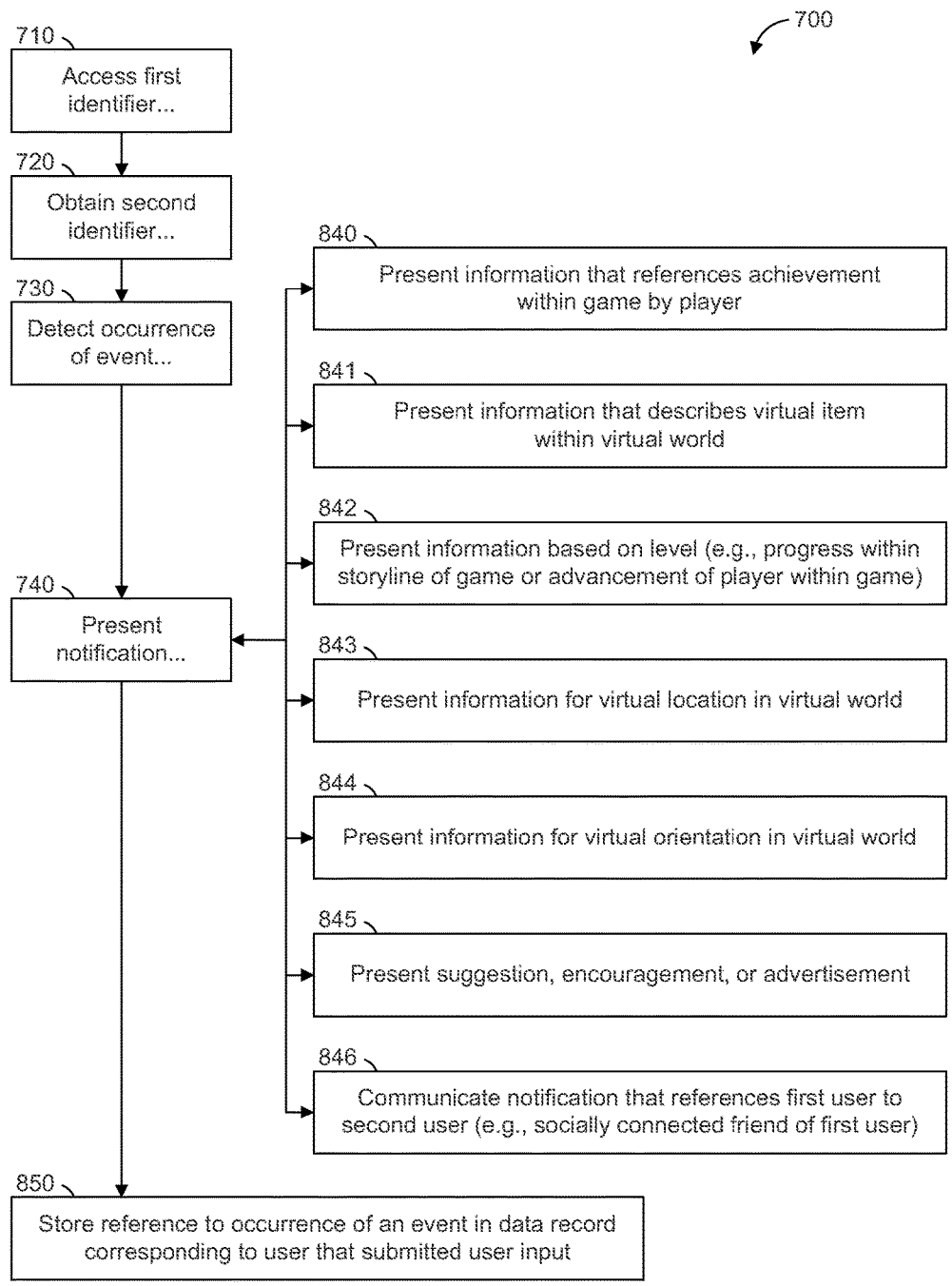

FIG. 7-9 are flowcharts illustrating operations of the device 131 in performing a method 700 of detecting the event 432 within the interactive media presentation 430, according to some example embodiments. Operations in the method 700 may be performed by the device 131 (e.g., separately from the device 130, or sharing one or more operations with the device 130), using modules described above with respect to FIG. 3. As shown in FIG. 7, the method 700 includes operation 710, 720, 730, and 740.

In operation 710, the reference module 310 of the device 131 accesses a first identifier (e.g., a first fingerprint or a first watermark). The first identifier may be a reference identifier and may be accessed from the database 115, and the first identifier may be obtained from the media content 410, which is presentable as part of the interactive media presentation 430. In some example embodiments, the reference module 310 accesses a first fingerprint generated from the media content 410 (e.g., by the fingerprint generation module 220 of the reference server 110). In certain example embodiments, the reference module 310 may access a first watermark extracted from the media content 410 (e.g., by the watermark extraction module 230 of the reference server 110).

In operation 720, according to some example embodiments, the fingerprint module 320 of the device 131 generates a second identifier (e.g., a second fingerprint) from a playback of the media content 410 as part of the interactive media presentation 430. The second identifier may be called a generated identifier. In certain example embodiments, the watermark module 330 of the device 131 extracts the second identifier (e.g., a second watermark) from the playback of the media content 410 as part of the interactive media presentation 430.

In operation 730, the detection module 340 of the device 131 detects an occurrence of the event 432 within the interactive media presentation 430. This detection may be based on the second identifier (e.g., generated identifier) matching the first identifier (e.g., reference identifier). For example, the detection module 340 may detect the occurrence of the event 432 by comparing an accessed first fingerprint (e.g., reference fingerprint) of the media content 410 to a generated second fingerprint (e.g., generated fingerprint) of the media content 410. Based on the accessed first fingerprint matching the generated second fingerprint, the detection module 340 may detect the occurrence of the event 432. As another example, the detection module 340 may detect the occurrence of the event 432 by comparing an accessed first watermark (e.g., reference watermark) of the media content 410 to an extracted second watermark (e.g., extracted watermark) of the media content 410. Based on the accessed first watermark matching the extracted second watermark, the detection module 340 may detect the occurrence of the event 432.

In operation 740, the presentation module 350 of the device 131 presents the notification 520, which may reference the occurrence of the event 432 within the interactive media presentation 430. As noted above, the event 432, the occurrence thereof, or both, may be detected based on the second identifier being determined to match the first identifier (e.g., in operation 730). For example, the presentation module 350 may present the notification 520 on a display screen of the device 131 (e.g., within an alert or other message). Accordingly, the notification 520 may be presented to the user 132 on the device 131, which may be functioning as a supplementary device that monitors the interactive media presentation 430 and provides notifications (e.g., notification 520) in response to detected events (e.g., event 432) therein.

In some example embodiments, the presentation module 250 of the device 131 causes the device 130 to present the notification 520 (e.g., within the user interface 500, in which the interactive media presentation 430 may be presented). Accordingly, the notification 520 may be presented to the user 132 on the device 130, which may be both presenting the interactive media presentation 430 and providing notifications (e.g., notification 520) in response to detected events (e.g., event 432) therein.

In certain example embodiments, the presentation module 350 causes the device 150 to present the notification 520 (e.g., within an alert or other message). For example, the notification 520 may be presented with the reference 660 (e.g., to the user 132). Accordingly, the notification 520 may be presented to the user 152 on the device 150, which may notify the user 152 that the user 132 has experienced the event 432 within the interactive media presentation 430, as indicated by detection of the playback of the media content 410 as part of the interactive media presentation 430.

As shown in FIG. 8, the method 700 may include one or more of operations 802, 810, 820, 826, and 828. Operation 802 may be performed prior to operation 710, and operation 710 may be performed in response to operation 802. In operation 802, the detection module 340 of the device 131 receives a request that a current portion of the interactive media presentation 430 be identified. For example, the detection module 340 may detect that the help button 510 (e.g., labeled "Get Help For This Level") has been activated (e.g., clicked or touched), where activation of the help button 510 initiates such a request to identify a current portion (e.g., a current level of a game) of the interactive media presentation 430. In example embodiments that include operation 802, one or more of operations 710, 720, and 740 may be performed based on the received request. Moreover, the presenting of the notification 520 in operation 740 may identify the current portion of the interactive media presentation 430 (e.g., the current level of the game). For example, the current portion of the interactive media presentation 430 may be named in the notification 520 (e.g., within information 620) or shown in the notification 520 (e.g., within the map 610).

In some example embodiments, the media content 410 is unique within the interactive media presentation 430, and the event 432 corresponds exclusively to the media content 410. In such example embodiments, occurrence of the event 432 is always accompanied by a playback of the media content 410, and a playback of the media content 410 always signifies the occurrence of the event 432. For example, the media content 410 may be a video (e.g., a "cut scene") that is played only between Level 3 and Level 4 (e.g., upon completion of Level 3) in a multi-level computer game. As another example, the media content 410 may be a sound (e.g., a trumpet fanfare) that is played only whenever a player is promoted to a higher rank in a military simulation game. In such example embodiments, the detecting of the occurrence of the event 432 in operation 730 may be performed based simply on the second identifier (e.g., generated fingerprint) matching the first identifier (e.g., reference fingerprint).

In alternative example embodiments, however, the media content 410 is not unique within the interactive media presentation 430. The event 432 may correspond nonexclusively to the media content 410. In such example embodiments, a matching of the second identifier to the first identifier in operation 730 may be insufficient to detect the event 432. Accordingly, one or more additional comparisons of generated identifiers to reference identifiers may be used by the device 131 to detect the event 432.

In operation 810, the reference module 310 of the device 131 accesses a third identifier in a manner similar to that described above with respect to operation 710. The third identifier may be a further reference identifier and may be accessed from the database 115, and the third identifier may be obtained from the media content 412, which is presentable as part of the interactive media presentation 430. In some example embodiments, the reference module 310 accesses a third fingerprint generated from the media content 412 (e.g., by the fingerprint generation module 220 of the reference server 110). In certain example embodiments, the reference module 310 may access a third watermark extracted from the media content 412 (e.g., by the watermark extraction module 230 of the reference server 110).

In operation 820, according to some example embodiments, the fingerprint module 320 of the device 131 generates a fourth identifier (e.g., a fourth fingerprint) from a playback of the media content 412 as part of the interactive media presentation 430. The fourth identifier may be called a further generated identifier. In certain example embodiments, the watermark module 330 of the device 131 extracts the fourth identifier (e.g., a fourth watermark) from the playback of the media content 412 as part of the interactive media presentation 430.

In example embodiments that include operations 810 and 820, the detecting of the occurrence of the event 432 in operation 730 may be based on the third identifier (e.g., further reference identifier) matching the fourth identifier (e.g., further generated identifier). For example, the detection module 340 may detect the occurrence of the event 432 by comparing accessed first and third fingerprints (e.g., reference fingerprints) to generated second and fourth fingerprints (e.g., generated fingerprints). Based on the accessed first fingerprint matching the generated second fingerprint and the accessed third fingerprint matching the generated fourth fingerprint, the detection module 340 may detect the occurrence of the event 432. As another example, the detection module 340 may detect the occurrence of the event 432 by comparing accessed first and third watermarks (e.g., reference watermarks) to extracted second and fourth watermarks (e.g., extracted watermarks). Based on the accessed first watermark matching the extracted second watermark and the third watermark matching the fourth watermark, the detection module 340 may detect the occurrence of the event 432.

In some example embodiments, the media content 410 is not unique within the interactive media presentation 430, but the event 432 corresponds exclusively to the playback of the media content 410 being contemporaneous (e.g., within a five-second window) with the playback of the media content 412 (e.g., further media content). In such example embodiments, the detecting of the occurrence of the event 432 in operation 730 may be based on the event 432 corresponding exclusively to the contemporaneous playback of the media content 410 with the media content 412. In other words, the event 432 may be detected based on the event 432 corresponding exclusively to the fact that the playback of the media content 410 is contemporaneous with the playback of the media content 412.

In certain example embodiments, the media content 410 is not unique within the interactive media presentation 430, but the event 432 corresponds nonexclusively to the playback of the media content 410 being contemporaneous (e.g., within a two-second window) with the playback of the media content 412 (e.g., further media content). In such example embodiments, the detecting of the occurrence of the event 432 in operation 730 may be based on a probability that the playback of the media content 410 is contemporaneous with the playback of the media content 412. In operation 826, the detection module 340 of the device 131 accesses such a probability (e.g., from the network-based system 105 or any portion thereof). For example, the detection module 340 may access a 90% probability that the event 432 is accompanied by a contemporaneous playback of the media content 410 with the media content 412. Accordingly, the detection module 340 may perform operation 730 based on the accessed probability.

Alternatively, in such example embodiments, the detecting of the occurrence of the event 432 in operation 730 may be based on a history of events that occurred within the interactive media presentation 430 prior to the playback of the media content 412 within the interactive media presentation 430. In operation 828, the detection module 340 of the device 131 accesses such a history of detected events (e.g., from the network-based system 105 or any portion thereof). For example, the detection module 340 may access a log of events that have been previously detected by the device 131 while monitoring the interactive media presentation 430, and the log of events may indicate that other events (e.g., aside from the event 432) signified by a playback of the media content 410, the media content 412, or both, have already been detected as already having occurred. Thus, the other events that have already occurred may be eliminated as potential candidates for detection in operation 730. Accordingly, the detection module 340 may perform operation 730 based on the accessed history of detected events.

As shown in FIG. 9, the method 700 may include one or more of operations 840, 841, 842, 843, 844, 845, 846, and

850. One or more of operations 840-846 may be performed as part (e.g., a precursor task, a subroutine, or a portion) of operation 740, in which the presentation module 350 of the device 131 presents the notification 520.

In some example embodiments, the event 432 includes (e.g., indicates or signifies) an achievement within a game by a player of the game (e.g., an in-game achievement by the user 132). Examples of such an achievement include completing a level of the game, performing a particular set of tasks within the game, gaining access to a feature of the game (e.g., discovering or unlocking hidden content or "Easter eggs"), or any suitable combination thereof. In operation 840, the presentation module 350 presents information 630, which may reference the achievement by the player. For example, the information 630 may include a congratulatory message that mentions the achievement. As another example, the information 630 may include a suggestion that the user 132 (e.g., player) share the achievement with a socially connected friend (e.g., by sending a message that references the achievement).

In certain example embodiments, the event 432 includes (e.g., indicates or signifies) an acquisition of a virtual item within a virtual world. Examples of such an acquisition include obtaining a significant talisman or weapon (e.g., within a fantasy adventure game that is set within a three-dimensional virtual world), gaining access to an upgrade to an existing virtual item (e.g., a faster car in a racing game), receiving a large sum of virtual money (e.g., treasure or prizes), or any suitable combination thereof. In operation 841, the presentation module 350 presents information 630, which may reference the acquisition of the virtual item. For example, the information 630 may include a congratulatory message that mentions the acquisition. As another example, the information 630 may include a suggestion that the user 132 (e.g., player) shares news of the acquisition with a socially connected friend (e.g., by sending a message that references the acquisition).

In some example embodiments, the event 432 includes (e.g., indicates or signifies) a level of progress within a storyline of a game. For example, the media content 410 may include video content, audio content, or both, that indicates the level of progress (e.g., special music that is specific to a particular section of the storyline). In operation 842, the presentation module 350 presents information 640, which may be based on, and may reference, the level of progress within the storyline. For example, the information 640 may include a summary of the storyline up to the current level of progress, a preview of the next level of progress in the storyline, advice, tips, suggestions, encouragements, or any suitable combination thereof.

In certain example embodiments, the event 432 includes (e.g., indicates or signifies) a level of advancement within the game by a player of the game (e.g., a new in-game rank attained by the user 132). For example, the media content 410 may include video content, audio content, or both, that indicates the level of advancement (e.g., special insignia presented on the screen or special sound effects). In operation 842, the presentation module 350 presents information 640, which may be based on, and may reference, the level of advancement within the game. For example, the information 640 may include a description of a rank to which the player has been promoted, a description of new abilities or powers accorded to the level of advancement, an indication of progress toward the next level of advancement, indication of effort (e.g., measured in time, actions, or both) expended in reaching the level of advancement, or any suitable combination thereof.

In some example embodiments, the media content 410 includes content (e.g., audio content or video content) that indicates a virtual location within a virtual world. As noted above, the notification 520 may include information (e.g., information 650) that corresponds to a virtual location, virtual orientation, or both, within a virtual world. Accordingly, in operation 843, the presentation module 350 of the device 131 presents information (e.g., information 650) that corresponds to (e.g., describes or references) the virtual location within the virtual world.

Moreover, as noted above, the media content 410 may be spatialized (e.g., by inclusion of multi-channel audio content) with respect to the three-dimensional virtual world. Hence, in operation 844, the presentation module 350 presents information (e.g., information 650) that corresponds to the virtual orientation (e.g., at the virtual location) within the virtual world.

According to various example embodiments, as noted above, the notification 520 may include information (e.g., information 620) that contains a help document, a guide, an encouragement, a suggestion, an advertisement, or any suitable combination thereof. Accordingly, in operation 845, the presentation module 350 of the device 131 presents a help document, a guide, an encouragement, a suggestion, an advertisement, or any suitable combination thereof, in performance of operation 740. In some example embodiments, the media content 410 indicates a failure to achieve a goal within the interactive media presentation 430 (e.g., a failure by a player of a videogame to achieve a goal within the game). In such example embodiments, operation 845 may involve presenting a suggestion on achieving the goal (e.g., in the next attempt or some future attempt), an encouragement to the player (e.g., to the user 132, that the user 132 try again to achieve a goal), or an advertisement for a virtual item within the interactive media presentation 430 (e.g., a purchasable virtual item that may facilitate achieving the goal), or any suitable combination thereof.

In operation 846, the presentation module 350 of the device 131 communicates the notification 520 with the reference 660, which may describe the user 132. As noted above, the notification 520 may be communicated to the user 152 (e.g., via the device 150), who may be socially connected (e.g., as a friend, follower, or connection) to the user 132 via one or more social networking services. This may have the effect of notifying the user 152 that the user 132 has experienced the event 432 within the interactive media presentation 430.

Operation 850 may be performed after operation 730, in which the detection module 340 of the device 131 detects the occurrence of the event 432. As shown in FIG. 9, operation 850 may follow operation 740, in which the presentation module 350 of the device 131 presents the notification 520. In operation 850, the detection module 340 stores a reference to the occurrence of the event 432. The reference may be stored in a data record (e.g., within the database 115) that corresponds to the user 132 (e.g., a player of a videogame) from whom the user input 420 may be received. As noted above, the user input 420 may be a basis (e.g., an influence, a factor, or a control signal) for the interactive media presentation 430. Accordingly, the stored reference may be usable to identify a portion (e.g., section, chapter, level, or part) of the interactive media presentation 430 that contains the event 432. That is, the stored reference may indicate, designate, or define the portion within which the event 432 is configured to occur (e.g., in response to the user input 420) within the interactive media presentation 430. This may have the effect making annotation that the user 132 has been presented with this portion of the interactive media presentation 430. In example embodiments where the interactive media presentation 430 is a game, operation 850 results in the detection of the event 432 within the interactive media presentation 430 being recorded (e.g., in the database 115) in a game history of the user 132.

According to various example embodiments, one or more of the methodologies described herein may facilitate detection of an event within a presentation of interactive media. Moreover, one or more of the methodologies described herein may facilitate presentation of a notification that references an event within such interactive media. Hence, one or more the methodologies described herein may facilitate provision of a supplementary information service that complements interactive media, independently, with or without communication from a source of the interactive media.

When these effects are considered in aggregate, one or more of the methodologies described herein may obviate a need for certain efforts or resources that otherwise would be involved in detecting events within interactive media presentations. Efforts expended by a user in identifying a current portion of an interactive media presentation may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
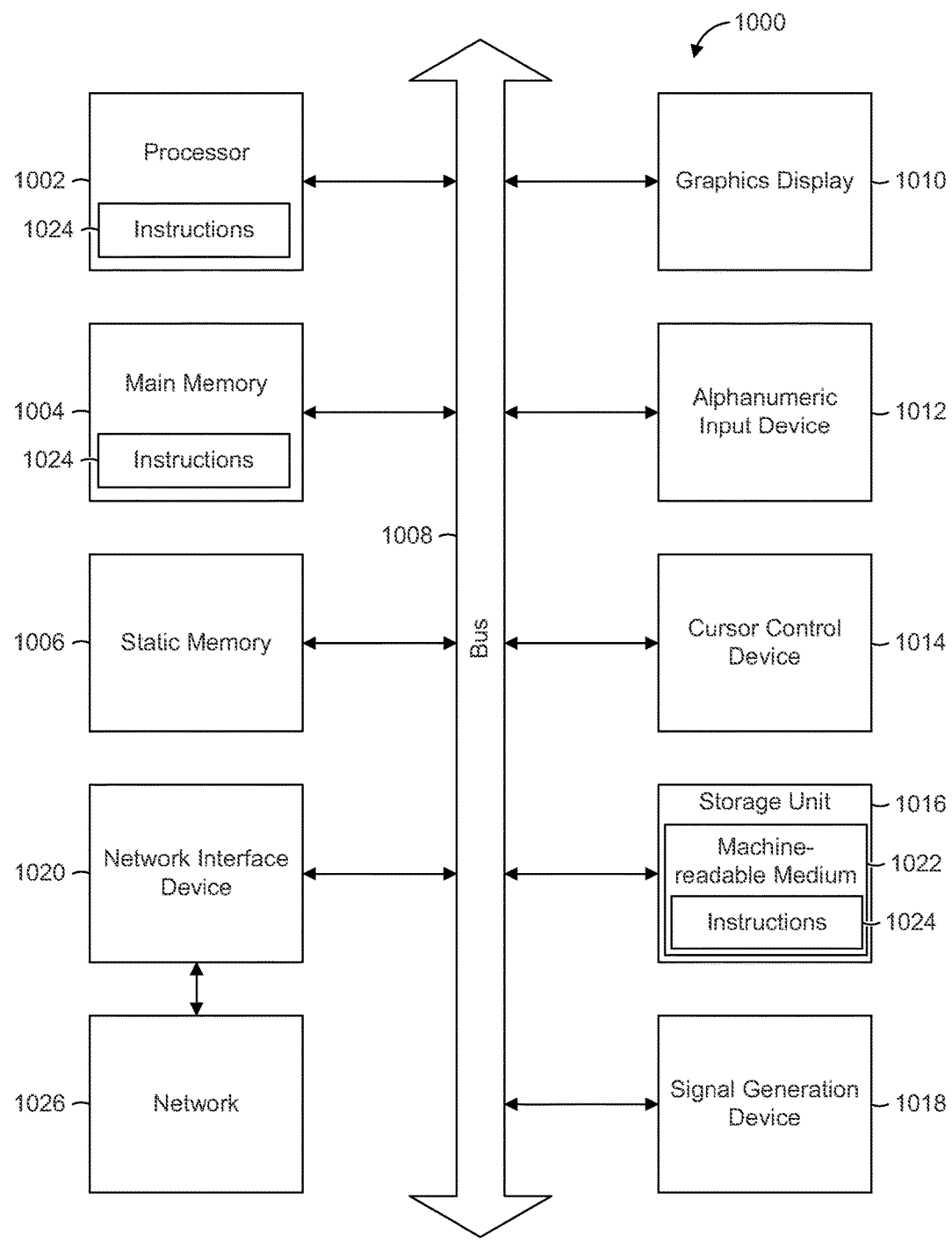
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to (e.g., configured to) read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument, such as a brain-control interface (BCI) or any other sensor capable of recording human biometrics as input for controlling a cursor), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A method comprising:
accessing a first fingerprint generated from media content that is presentable as part of an interactive media presentation within which an event that corresponds to the media content is configured to occur in response to a user input;
generating a second fingerprint from a playback of the media content as part of the interactive media presentation;
detecting an occurrence of the event within the interactive media presentation based on the second fingerprint matching the first fingerprint,
the detecting of the occurrence of the event being performed by a processor of a machine; and
presenting a notification that references the occurrence of the event within the interactive media presentation detected based on the second fingerprint matching the first fingerprint.

2. The method of description 1, wherein:
the media content is unique within the interactive media presentation; and
the event corresponds exclusively to the media content.

3. The method of description 1, wherein:
the media content is not unique within the interactive media presentation;
the event corresponds nonexclusively to the media content; and
the detecting of the occurrence of the event is based on a third fingerprint generated from further media content of the interactive media presentation matching a fourth fingerprint generated from a playback of the further media content as part of the interactive media presentation.

4. The method of description 3, wherein:
the event corresponds exclusively to the playback of the media content being contemporaneous with the playback of the further media content; and
the detecting of the occurrence of the event is based on the event corresponding exclusively to the playback of the media content being contemporaneous with the playback of the further media content.

5. The method of description 3, wherein:
the event corresponds nonexclusively to the playback of the media content being contemporaneous with the playback of the further media content; and
the detecting of the occurrence of the event is based on a probability that the playback of the media content is contemporaneous with the playback of the further media content.

6. The method of description 3 or description 5, wherein:
the event corresponds nonexclusively to the playback of the media content being contemporaneous with the playback of the further media content; and
the detecting of the occurrence of the event is based on a history of events that occurred within the interactive media presentation prior to the playback of the further media content.

7. The method of any of descriptions 1-6, wherein:
the generating of the second fingerprint is in response to a request that a current portion of the interactive media presentation be identified;
the presenting of the notification identifies the current portion of the interactive media presentation; and the method further comprises
receiving the request that the current portion of the interactive media presentation be identified.

8. The method of any of descriptions 1-7, wherein:
the event includes an achievement within a game by a player of the game; and
the presenting of the notification presents information that references the achievement by the player.

9. The method of any of descriptions 1-8, wherein:
the event includes acquisition of a virtual item within a virtual world; and
the presenting of the notification presents information that describes the virtual item.

10. The method of any of descriptions 1-9, wherein:
the media content includes video content that indicates a level of progress within a storyline of a game; and
the presenting of the notification presents information based on the level of progress within the storyline of the game.

11. The method of any of descriptions 1-10, wherein:
the media content includes audio content that indicates a level of advancement within a game by a player of the game; and
the presenting of the notification presents information based on the level of advancement within the game by the player.

12. The method of any of descriptions 1-11, wherein:
the media content includes audio content that indicates a virtual location within a virtual world; and
the presenting of the notification presents information that corresponds to the virtual location within the virtual world.

13. The method of any of descriptions 1-12, wherein:
the media content includes multi-channel audio content that indicates a virtual orientation within a virtual world; and
the presenting of the notification presents information that corresponds to the virtual orientation within the virtual world.

14. The method of any of descriptions 1-13, wherein:
the media content indicates a failure to achieve a goal within a game by a player of the game; and
the presenting of the notification presents at least one of a suggestion on achieving the goal, an encouragement to the player, or an advertisement for a virtual item within the game.

15. The method of any of descriptions 1-14, wherein:
a first user that submitted the user input is socially connected to a second user according to a social network; and
the presenting of the notification includes communicating the notification with a reference to the first user to a device of the second user.

16. The method of any of descriptions 1-15 further comprising:
storing a reference to the occurrence of the event in a data record that corresponds to a user that submitted the user input,
the stored reference being usable to identify the part of the interactive media presentation within which the event is configured to occur.

17. A non-transitory machine-readable storage medium comprising instructions that, when executed by one or more processors of a machine, cause the machine to perform operations comprising:
accessing a first fingerprint generated from media content that is presentable as part of an interactive media presentation within which an event that corresponds to the media content is configured to occur in response to a user input;

generating a second fingerprint from a playback of the media content as part of the interactive media presentation;
detecting an occurrence of the event within the interactive media presentation based on the second fingerprint matching the first fingerprint,
the detecting of the occurrence of the event being performed by the one or more processors of the machine; and
presenting a notification that references the occurrence of the event within the interactive media presentation detected based on the second fingerprint matching the first fingerprint.

18. The non-transitory machine-readable storage medium of description 17, wherein:
the media content is not unique within the interactive media presentation;
the event corresponds nonexclusively to the media content; and
the detecting of the occurrence of the event is based on a third fingerprint generated from further media content of the interactive media presentation matching a fourth fingerprint generated from a playback of the further media content as part of the interactive media presentation.

19. A system comprising:
a reference module configured to access a first fingerprint generated from media content that is presentable as part of an interactive media presentation within which an event that corresponds to the media content is configured to occur in response to a user input;
a fingerprint module configured to generate a second fingerprint from a playback of the media content as part of the interactive media presentation;
a processor configured by a detection module to detect an occurrence of the event within the interactive media presentation based on the second fingerprint matching the first fingerprint; and
a presentation module configured to present a notification that references the occurrence of the event within the interactive media presentation detected based on the second fingerprint matching the first fingerprint.

20. The system of description 19, wherein:
the media content is not unique within the interactive media presentation;
the event corresponds nonexclusively to the media content; and
the detection module configures the processor to detect the occurrence of the event based on a third fingerprint generated from further media content of the interactive media presentation matching a fourth fingerprint generated from a playback of the further media content as part of the interactive media presentation.

21. A non-transitory machine-readable storage medium comprising instructions that, when executed by one or more processors of a machine, cause the machine to perform operations comprising:
accessing a first watermark embedded within media content that is presentable as part of an interactive media presentation within which an event that corresponds to the media content is configured to occur in response to a user input;
detecting a second watermark within a playback of the media content as part of the interactive media presentation;
detecting an occurrence of the event within the interactive media presentation based on the second watermark matching the first watermark,
the detecting of the occurrence of the event being performed by the one or more processors of the machine; and
presenting a notification that references the occurrence of the event within the interactive media presentation detected based on the second watermark matching the first watermark.

What is claimed is:

1. A non-transitory machine-readable medium storing instructions executable by a processor to cause a machine to carry out operations including:
accessing a database that stores reference fingerprints, wherein a reference fingerprint among the reference fingerprints is generated from spatialized media content, the spatialized media content being spatialized in three dimensions and indicating a virtual orientation at a virtual location in a virtual world;
detecting that a query fingerprint representing interactive media content playback by a presentation device matches the reference fingerprint among the stored reference fingerprints, wherein the detecting establishes that the interactive media content playback represents the virtual orientation at the virtual location within the virtual world; and
based on the detecting that the query fingerprint representing the interactive media content playback by the presentation device matches the reference fingerprint among the stored reference fingerprints, causing presentation of a notification that corresponds to the virtual orientation at the virtual location within the virtual world.

2. The non-transitory machine-readable medium of claim 1, wherein the spatialized media content includes spatialized multi-channel audio content that indicates the virtual orientation at the virtual location in the virtual world.

3. The non-transitory machine-readable medium of claim 1,
wherein the virtual world is included in an interactive media presentation that enables navigation within the virtual world in response to user input, and
wherein the query fingerprint is generated in response to the playback of the interactive media content occurring during navigation within the virtual world in response to the user input.

4. The non-transitory machine-readable medium of claim 1,
wherein the virtual world is included in an interactive media presentation that enables an avatar of a user to selectively move among multiple virtual locations in the virtual world and selectively orient toward any of multiple virtual orientations within the virtual world, and
wherein the query fingerprint is generated in response to the playback of the interactive media content being triggered by the avatar moving to the virtual location and orienting toward the virtual orientation within the virtual world.

5. The non-transitory machine-readable medium of claim 1,
wherein the virtual location is a first virtual location in the virtual world,
wherein the spatialized media content indicates the first virtual location and a second virtual location in the virtual world,
wherein the query fingerprint is a first query fingerprint,
wherein the reference fingerprint is a first reference fingerprint, and
wherein the providing the notification is further based on a second reference fingerprint matching a second query fingerprint in conjunction with the first reference fingerprint matching the first query fingerprint.

6. The non-transitory machine-readable medium of claim 1,
wherein the spatialized media content further indicates acquisition of a virtual item within the virtual world, and
wherein the notification includes information describing the virtual item.

7. The non-transitory machine-readable medium of claim 1,
wherein the spatialized media content further indicates a level of progress within a storyline of an interactive media presentation, and
wherein the notification includes information based on the level of progress within the storyline of the interactive media presentation.

8. The non-transitory machine-readable medium of claim 1,
wherein the spatialized media content further indicates an achievement within a game being played by a user, and
wherein the notification includes information corresponding with the achievement within the game.

9. The non-transitory machine-readable medium of claim 1,
wherein the spatialized media content further indicates a failure to achieve a goal within a game being played by a user, and
wherein the notification includes information corresponding with the failure to achieve a goal within the game.

10. The non-transitory machine-readable medium of claim 1, wherein causing presentation of the notification comprises causing the presentation device to present the notification.

11. The non-transitory machine-readable medium of claim 1,
wherein the virtual world is included in an interactive media presentation that presents events within the virtual world in response to user input submitted by a user,
wherein the notification include information, and
wherein causing of the presentation of the notification includes communicating the information to a device of the user.

12. The non-transitory machine-readable medium of claim 1,
wherein the virtual world is included in an interactive media presentation that presents events within the virtual world in response to user input submitted by a first user,
wherein the notification include information, and
wherein the causing of the presentation of the notification includes communicating the information to a device of a second user that is socially connected to the first user according to a social networking service.

13. A method comprising:
accessing a database that stores reference fingerprints, wherein a reference fingerprint among the reference fingerprints is generated from spatialized media content, the spatialized media content being spatialized in three dimensions and indicating a virtual orientation at a virtual location in a virtual world;
detecting that a query fingerprint representing interactive media content playback by a presentation device matches the reference fingerprint among the stored reference fingerprints, wherein the detecting establishes that the interactive media content playback represents the virtual orientation at the virtual location within the virtual world; and
based on the detecting that the query fingerprint representing the interactive media content playback by the presentation device matches the reference fingerprint among the stored reference fingerprints, causing presentation of a notification that corresponds to the virtual orientation at the virtual location within the virtual world.

14. The method of claim 13, wherein the spatialized media content includes spatialized multi-channel audio content that indicates the virtual orientation at the virtual location in the virtual world.

15. The method of claim 13,
wherein the virtual location is a first virtual location in the virtual world,
wherein the spatialized media content indicates the first virtual location and a second virtual location in the virtual world,
wherein the query fingerprint is a first query fingerprint,
wherein the reference fingerprint is a first reference fingerprint, and
wherein the providing the notification is further based on a second reference fingerprint matching a second query fingerprint in conjunction with the first reference fingerprint matching the first query fingerprint.

16. The method of claim 3, wherein causing presentation of the notification comprises causing the presentation device to present the notification.

17. A system comprising:
a processing unit;
memory storing instructions that, when executed by at least the processing unit, cause the system to perform operations including:
accessing a database that stores reference fingerprints, wherein a reference fingerprint among the reference fingerprints is generated from spatialized media content, the spatialized media content being spatialized in three dimensions and indicating a virtual orientation at a virtual location in a virtual world,
detecting that a query fingerprint representing interactive media content playback by a presentation device matches the reference fingerprint among the stored reference fingerprints, wherein the detecting establishes that the interactive media content playback represents the virtual orientation at the virtual location within the virtual world, and
based on the detecting that the query fingerprint representing the interactive media content playback by the presentation device matches the reference fingerprint among the stored reference fingerprints, causing presentation of a notification that corresponds to the virtual orientation at the virtual location within the virtual world.

18. The system of claim 17, wherein the spatialized media content includes spatialized multi-channel audio content that indicates the virtual orientation at the virtual location in the virtual world.

19. The system of claim 17,
wherein the virtual location is a first virtual location in the virtual world,
wherein the spatialized media content indicates the first virtual location and a second virtual location in the virtual world,
wherein the query fingerprint is a first query fingerprint,
wherein the reference fingerprint is a first reference fingerprint, and wherein the providing the notification is further based on a second reference fingerprint matching a second query fingerprint in conjunction with the first reference fingerprint matching the first query fingerprint.

20. The system of claim 17, wherein causing presentation of the notification comprises causing the presentation device to present the notification.

\* \* \* \* \*